United States Patent [19]

Kokubu

[11] Patent Number: 4,860,110
[45] Date of Patent: Aug. 22, 1989

[54] COMMUNICATION TERMINAL DEVICE

[75] Inventor: Nobuaki Kokubu, Tokyo, Japan

[73] Assignee: Canon Kabushiki Kaisha, Tokyo, Japan

[21] Appl. No.: 46,158

[22] Filed: May 5, 1987

[30] Foreign Application Priority Data

May 6, 1986 [JP] Japan ................. 61-104182

[51] Int. Cl.⁴ ............... H04N 1/32; H04N 1/387; H04N 1/40
[52] U.S. Cl. ..................... 358/400; 358/434; 358/443; 364/519
[58] Field of Search ............ 358/280, 256, 257; 364/518, 519; 379/100

[56] References Cited

U.S. PATENT DOCUMENTS

| | | | |
|---|---|---|---|
| 4,454,575 | 6/1984 | Bushaw | 358/256 |
| 4,499,500 | 2/1985 | Nagashima | 358/280 |
| 4,511,928 | 4/1985 | Colomb | 364/519 |
| 4,587,633 | 5/1986 | Wang | 358/256 |
| 4,597,018 | 6/1986 | Sonobe | 364/519 |
| 4,672,459 | 6/1987 | Kudo | 358/280 |

Primary Examiner—Howard W. Britton
Attorney, Agent, or Firm—Fitzpatrick, Cella, Harper & Scinto

[57] ABSTRACT

A communication terminal device comprises a memory capable storing a plurality of pages of received information, and a printer for printing the information stored in the memory. A read sequence from the memory to the printer is determined in accordance with a send command.

16 Claims, 6 Drawing Sheets

COMMUNICATION TERMINAL DEVICE

BACKGROUND OF THE INVENTION

1. Field of the Invention

The present invention relates to a communication terminal device such as a facsimile machine.

2. Related Background Art

A facsimile communication apparatus which has an image memory and stores a plurality of pages of communication images received from a sending station into the image memory and then records, them on record sheets, has been known. In such a device, when a plurality of sets of the record sheets of the communication images are required in a receiving station, an operation of "number of copies: n" is carried out so that n record sheets are produced for each page in the sequence transmitted by the transmitter.

This system is effective when the received communication images of a plurality of pages are independent information from each other, but if it is a series of continuous pages, the record sheets must be rearranged after outputting.

A device which guides the record sheets to different trays by a mechanical sorter by automatically rearrange the record sheets has been known. In this device, as the number of trays increases, a physically larger and larger device is required. Therefore, it is difficult to rearrange a number of continuous pages of record sheets in this device.

SUMMARY OF THE INVENTION

It is an object of the present invention to provided a communication terminal device which eliminates the above disadvantages.

It is another object of the present invention to provide a communication terminal device which enables binding record sheets without rearranging them.

It is still another object of the present invention to facilitate handling of record sheets irrespective of the printing method.

It is still another object of the present invention to provide a communication terminal device which allows setting the order of recording of a plurality of pages of received information.

It is still another object of the present invention to provide a facsimile machine having a memory which can store a plurality of pages of received information.

The above and other objects of the present invention will be apparent from the following description of the preferred embodiments.

DETAILED DESCRIPTION OF THE PREFERRED EMBODIMENT

Figure 1:
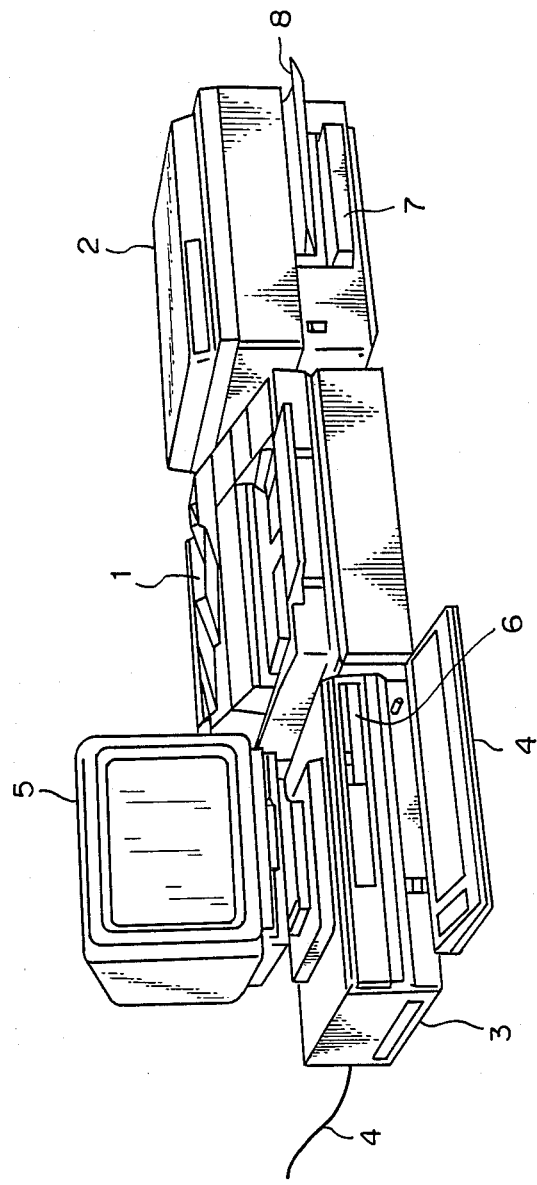
FIG. 1 shows a perspective view of a communication terminal device.

FIG. 1 shows a communication terminal device of the present invention which can transmit and receive a facsimile image. Numeral 1 denotes a reader which reads a document and converts it to an electrical signal, and numeral 2 denotes a laser beam printer which prints one page of information received or read by the reader into a cut sheet fed from a sheet casette 7 in an electrophotographic system by laser and ejects the sheet onto a tray 8 with the printed side facing up. The electrophotographing process for printing is not stopped until one page of print is completed.

Figure 2:
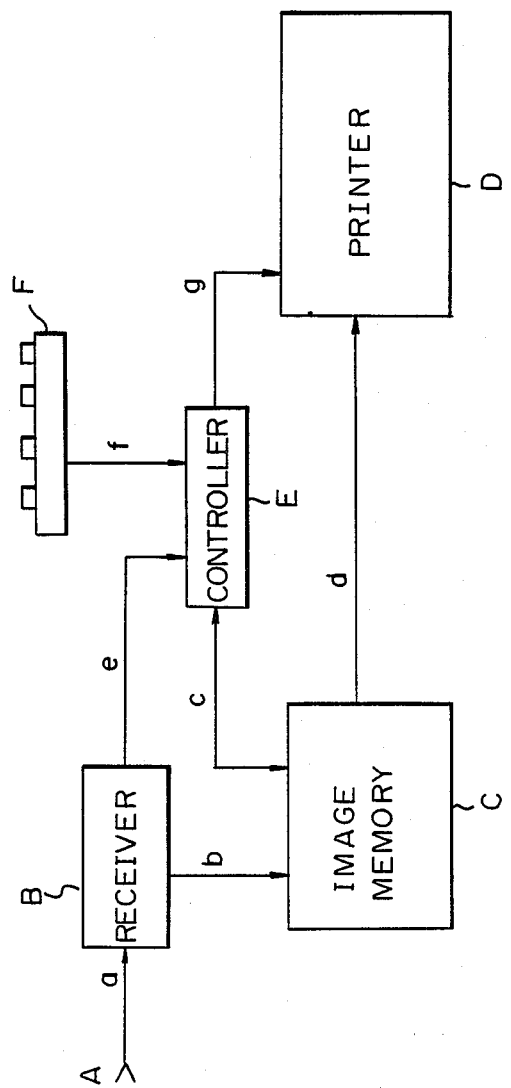
FIG. 2 shows a control block diagram.

Numeral 3 denotes a facsimile machine provided with a modem, printer 2, a communication control unit CCU, a controller E (see FIG. 2) and a memory C of FIG. 2. The facsimile machine transmits the data read by the reader 1 through a line or prints the information received from the line. The numeral 4 denotes a keyboard for entering a dialing number of a destination station, a transmit command, a print command, the number of print sheets, and total number of pages of transmitted information. The keyboard 4 has character input means for composing a text and displaying it on a CRT display 5. The composed text is transmitted as a code signal through the line 4 one page at a time. The received text code information is converted to bit information by the CRT 5 and is printed by the printer 2. The image information read by the reader 1 (pixel bit information) and the composed text information (character code information) may be combined in one page for transmission or reception. A floppy disk 6 temporarily stores the transmission reception information and stores a program for composing text. It may be shared by the memory C shown in FIG. 2.

The facsimile machine has encoding and decoding means for transmission and reception.

FIG. 2 shows a block diagram of a portion of the facsimile machine which relates to reception and recording. A denotes an incoming line from a network, B denotes a receiver (having a communication control unit), C denotes an image memory, D denotes a printer for printing a content of the image memory onto a record sheet, E denotes a controller for controlling a flow of image information and an address in the image memory and comprises CPU, (or a microcomputer), ROM and RAM, and F denotes a console (keyboard 4 of FIG. 1) for supplying user operational information to the controller E. The ROM of the controller E contains programs for print control shown in the flow charts of FIGS. 3 to 6.

When the receiver B receives a plurality of sheets of image imformation from the line A through a signal line a, it informs it to the controller E sheet by sheet through a signal line e. The controller E counts the number of pages of the control information and instructs through a signal line c which page of image information is to be stored at which address of the image memory C. The image memory C stores the image information in accordance with the instruction from the signal line c. It is assumed that M pages of image information have been stored in the image memory C, and a user of the system operates the console F so that a "number of copies: n" signal is sent to the controller E through a signal line f.

Figure 3:
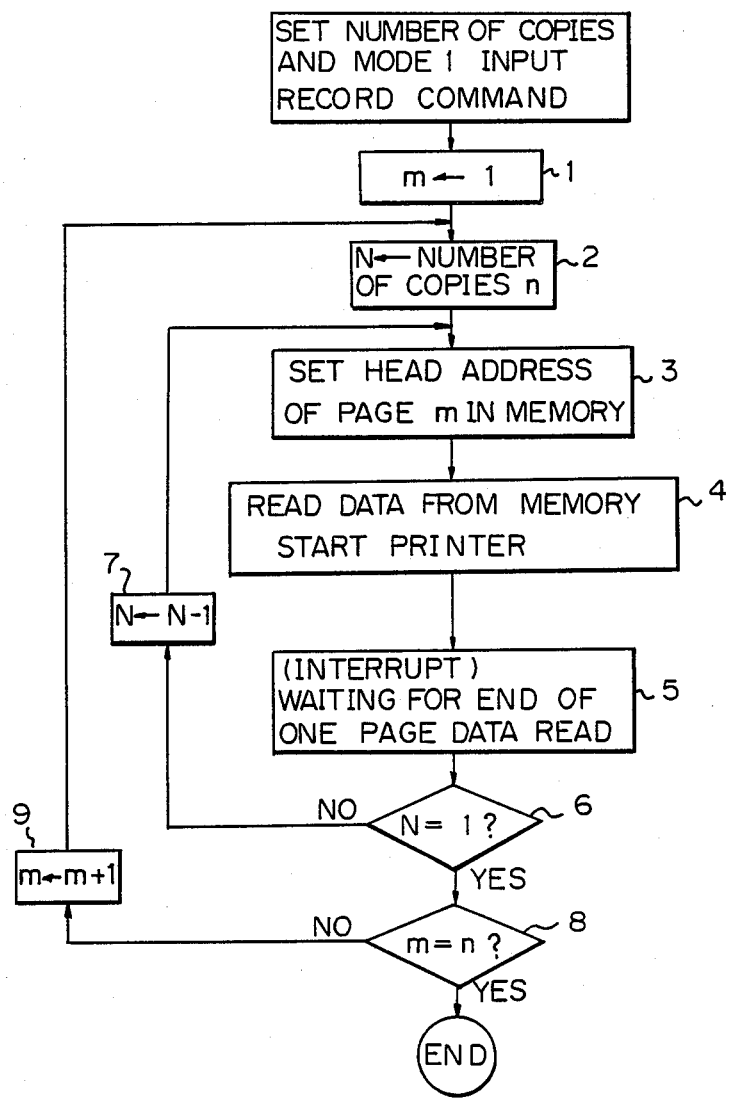
FIG. 3 to 6 show control process flow charts for reception and recording.

The controller E accesses the page information firstly stored in the image memory through the signal line c, and repeats it n times. The image signal thus read is sent to the printer D through the signal line d. On the other hand, the controller E issues a record command to the printer D through the signal line g so that the printer D outputs n record sheets on which first page of image information is printed. Then, the controller reads the second page and the printer outputs n record sheets. The above steps are repeated until page M is reached. Thus, the printer D outputs n sheets for each of M pages. This is inadvantageous when the document comprises a series of pages. The operation flow of the controller E for such operation is shown in FIG. 3. M represents the total number of pages received by the controller, and m and N are variables. Those are stored in the RAM.

When the number n of prints, a print start command and a mode 1 select command have all been received, the flow of FIG. 3 is started. A parameter m is set to "1" to indicate that the page information to be printed is page 1 (step 1). Then, a parameter N is set to a desired number of prints n (step 2), a start address of the page 1 (first page information received) in the memory is specified (step 3). Memory is accessed at that address and the data read from the memory is sent to the printer D by a known DMA system. The printer is activated to start printing in accordance with the read data (step 4). After one page of data has been read (step 5), the parameter N is checked to determine whether it is 1 or not (step 6). If it is more than 1, N is decremented by one (step 7). Then, the steps 3 et seq. are repeated until N reaches 1, when whether all of the plurality of pages of information of the memory have been printed or not is checked (step 8). If the decision is NO, the parameter m is incremented by one (step 9) and the steps 2 et seq. are repeated to start the reading of page 2. In this manner, n prints are made for each of the plurality of pages of the memory.

The memory C may be a several-M-byte hard disk or semiconductor memory fixedly installed in the facsimile machine.

Figure 4:
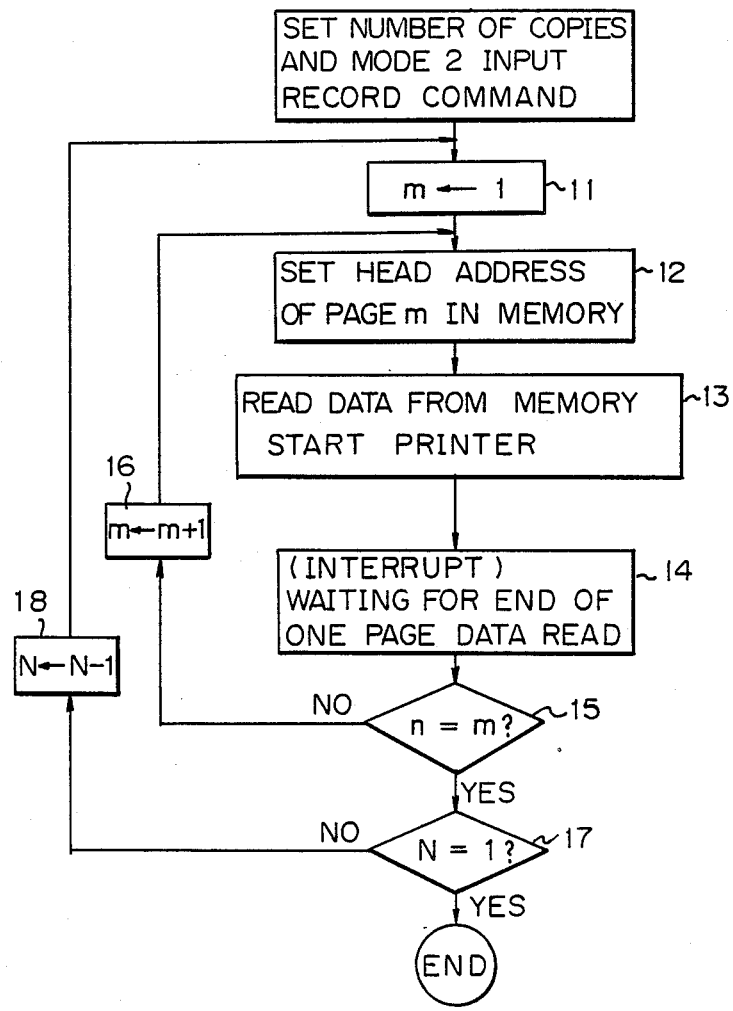

A second mode shown in FIG. 4 is now explained.

The controller E reads one page of image information first received and stored, only once through the signal line c and activates the printer D to output first page of record sheet. Then, second page of image information is read and second page of record sheet is outputted. The above steps are repeated until page M is reached, when the controller E again reads page 1 and page 2 and outputs them on the record sheets. In the second mode, this series of operation is repeated n times. Thus, the output record sheets comprise n sets of record sheets with the record sheets being ordered from page 1 to page M in each set.

A desired number of prints n is set into the parameter N, the print mode is selected and the print start command is entered from the console F. The parameter m is set to indicate that the printing starts from page 1 (step 11), a start address of the page 1 of the memory is accessed, the page information is read, and the end of reading of page 1 is monitored (steps 12-14). Upon the end of printing of page 1, page 2 of the memory is read, etc., and this procedure is repeated until page M is reached (steps 12-15). After M pages have been printed, printing of the second set is started. The steps 11 et seq. are repeated until n sets are printed. In this manner, the print mode of the memory may be changed through the console F as required.

In the step 5 of FIG. 3 and the step 14 of FIG. 4, the end of page is determined on the basis of the EOP (end of page) signal sent as the received signal and set in the memory manager of the controller E. The mode 1 or 2 may be determined by the command signal from the transmitting station.

If, but only if, continuous pages are sent from the transmitting station, the mode 2 may be enabled upon the reception of a command signal indicating continuous pages by the receiver so as to select the mode 2.

Instead of recording in the order of reception, the memory may be read in the reverse order to the order of reception in response to a command from the transmitting station, and they may be repetitively recorded. In the flow after the command is detected, the start address for reading in FIG. 4 is set to the start address of the last received page. Accordingly, when the record sheets are ejected rear side up, the record sheets are arranged in page sequence (mode 3). When a command from the transmitting station instructs repetitive recording of only page m of the pages 1 to m of the transmitted image (mode 4) or repetitive recording of other than page m, only the page m is repetitively read after the pages 1 to m have been read for the former case, or pages 1 to m to 1 are repetitively read after the pages 1 to m have been read for the latter case.

Figure 5:
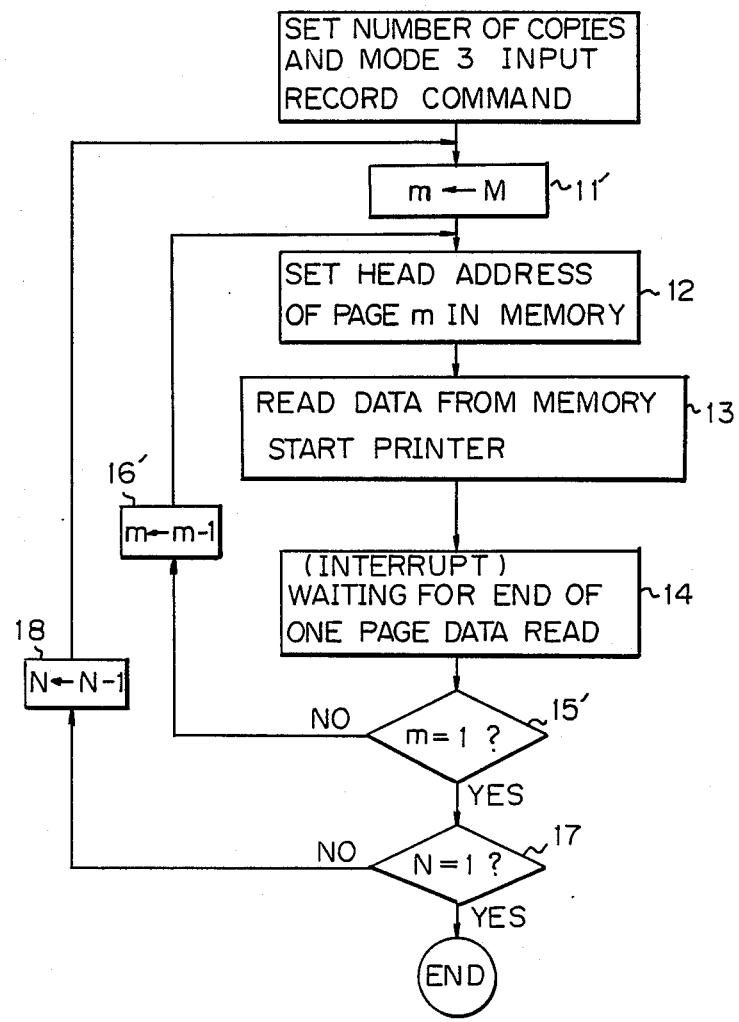

FIG. 5 shows a flow chart of the mode 3. A step 11' corresponds to the step 11 of FIG. 4, a step 15' corresponds to the step 15 and a step 16' corresponds to the step 16. In order to set the start address for reading to the start address of the last received page, the parameter m is set to M in the step 11', whether m is 1 or not is examined in the step 15', and m is decremented in the step 16'.

Figure 6:
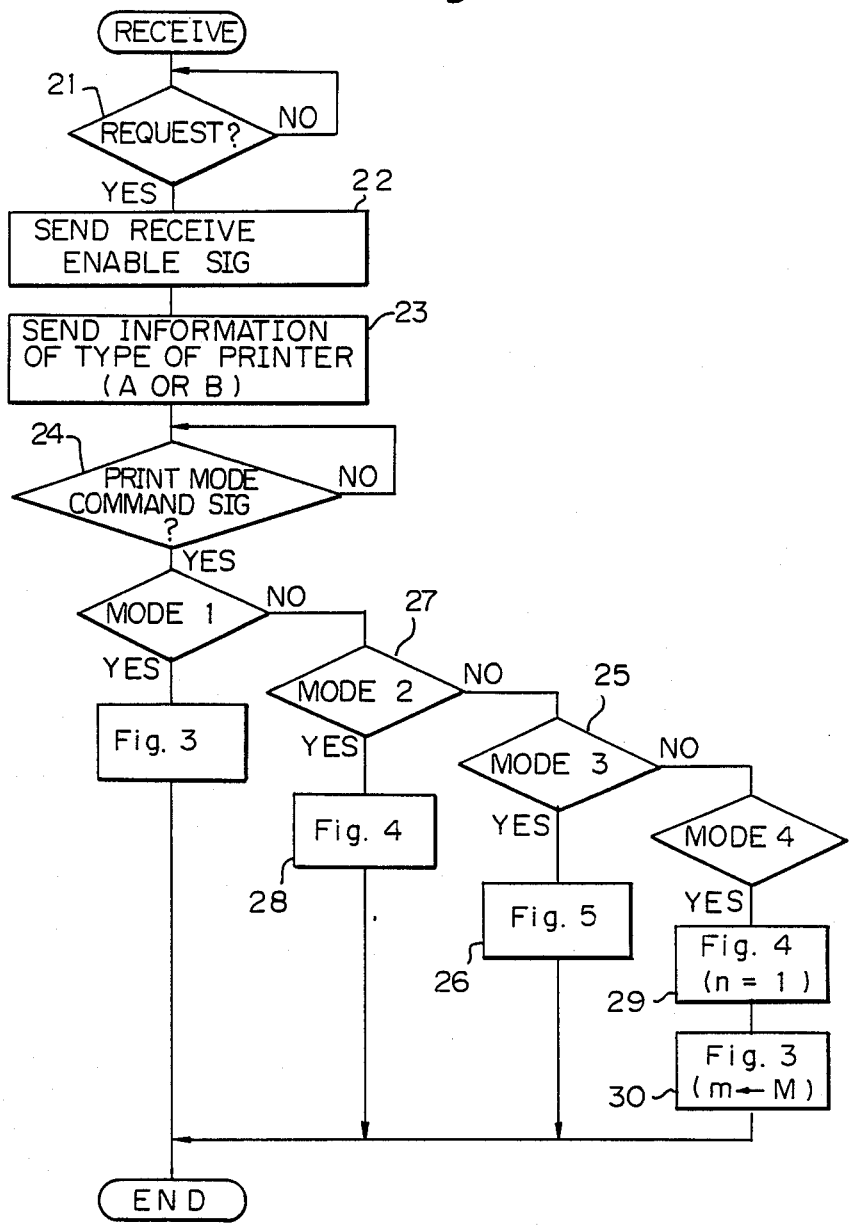

FIG. 6 shows a flow chart of select print mode by a send command in the receiving station. When a send request signal is sent from the transmitting station, it is detected (step 21), and if the memory C is empty and can receive data, an enable signal is sent to the transmitting station (step 22). Then, the type of printer in the receiving station is informed to the transmitting station. In the present embodiment, the printer is a laser beam printer and the print sheets are ejected with the printed plane facing up. Accordingly, a type A is informed to the transmitting station. If the sheets are ejected with the printed place facing down, a type B is informed (step 23). Then, the reception of the print mode command signal from the transmitting station is monitored (step 24). When the command is received, the mode is determined from the command data. If it is mode 3, the printing is done from the last one of the received pages in the memory as shown in FIG. 5 (steps 25 and 26). If it is mode 2, the printing is done in the sequence of received pages (steps 27 and 28). In this case, if the printer is of the type A, it corresponds to a case where pages are transmitted from the transmitting station starting from the last page. In this case, the printing is done in page sequence and hence the printed sheets need not be rearranged.

In the type B printing, the print sequence can be properly determined by the command and the printed sheets need not be rearranged.

In the mode 4, n in FIG. 4 is set to 1 so that all pages are sequentially printed one by one (step 29). Then, m in FIG. 3 is set to the last page M so that printing of page M is repeated n times (step 30).

The present invention may be combined with a mechanical sorter. In this case a tray may be replaced with another one after the tray has received pages 1 to M. Accordingly, handling of the apparatus according to the present invention can be facilitated.

In the present embodiment, the print mode is determined by the received command data. Alternatively, the received command data and the type of printer may be compared after the reception of the command, and if they are equal, printing may be started automatically in the receive mode or manually by the print command in the receiving station, and if they are not equal, a warning is displayed. In this manner, precision of mode selection is enhanced.

When the mode is specified in the receiving station, the received command and the type of printer may also be compared to enhance the precision.

A mechanical sorter may be used in combination with such apparatus as described above. Since the trays of the record sheets may be changed after pages 1 to M have been outputted, the operation of the machine may be simplified.

I claim:

1. A receiving apparatus comprising:
   (a) first receiving means for receiving information divided into a plurality of blocks;
   (b) second receiving means for receiving data for designating predetermined one or ones of the information received through said first receiving means;
   (c) recording means for visually recording on a recording material the information received through said first receiving means; and
   (d) control means for controlling said recording means, said control means operating such that the designated block is record-processed differently from another block;
   said control means operating such that a number of times the designated block is recorded is different from that of another block.

2. An apparatus according to claim 1, further comprising output means for supplying the information received through said first receiving means to a monitor to visually reproduce the information.

3. An apparatus according to claim 1, further comprising a monitor for displaying the received information.

4. An apparatus according to claim 1, further comprising storage means for storing a plurality of blocks of the information received through said first receiving means.

5. An apparatus according to claim 1, wherein said second receiving means includes discriminating means for discriminating block designating data sent together with the information.

6. An apparatus according to claim 1, wherein said control means operates such that block to be recorded and blocks not to be recorded, from among the received plurality of blocks, may be separately processed on the basis of the designated block.

7. An apparatus according to claim 1, wherein said recording means is a laser beam printer.

8. An apparatus according to claim 1, wherein the information represents image information of an original document, and the image information is sent for each page.

9. A receiving apparatus comprising:
   (a) receiving means for receiving information divided into a plurality of blocks;
   (b) designating means for designating a reproducing order of the blocks of information received through said receiving means;
   (c) recording means for visually recording the information received through said receiving means onto a recording material; and
   (d) control means for controlling said recording means, said control means operating such that the blocks of information are recorded in the order designated by said designating means.

10. An apparatus according to claim 9, further comprising output means for supplying the information received through said receiving means to a monitor to visually reproduce the information.

11. An apparatus according to claim 9, further comprising a monitor for displaying the received information.

12. An apparatus according to claim 9, further comprising storage means for storing a plurality of blocks of the information received through said receiving means.

13. An apparatus according to claim 9, wherein said designating means includes discriminating means for discriminating data representative of a recording order sent together with the information.

14. An apparatus according of claim 9, wherein said recording means is a laser beam printer.

15. An apparatus according to claim 9, wherein said control means causes the plurality of blocks of information to be recorded in the recording order designated by said designating means, at predetermined times.

16. An apparatus according to claim 9, wherein the information represents image information of an original document, and the image information is sent for each page.

* * * * *

UNITED STATES PATENT AND TRADEMARK OFFICE
CERTIFICATE OF CORRECTION

PATENT NO. : 4,860,110
DATED : August 22, 1989
INVENTOR(S) : NOBUAKI KOKUBU

It is certified that error appears in the above-identified patent and that said Letters Patent is hereby corrected as shown below:

AT [57] ABSTRACT

Line 2, "capable" should read --capable of--.

COLUMN 1

Line 12, "records," should read --records--.
    Line 68, "into" should read --onto--.

COLUMN 4

Line 15, "pages 1 to m to 1" should read
        --pages 1 to m-1--.

COLUMN 5

Line 45, "block" should read --blocks--.

Signed and Sealed this

Ninth Day of October, 1990

*Attest:*

HARRY F. MANBECK, JR.

*Attesting Officer*      *Commissioner of Patents and Trademarks*